US012086335B2

(12) United States Patent
Lee

(10) Patent No.: US 12,086,335 B2
(45) Date of Patent: *Sep. 10, 2024

(54) DEVICE, METHOD AND PROGRAM FOR GENERATING MULTIDIMENSIONAL REACTION-TYPE IMAGE, AND METHOD AND PROGRAM FOR REPRODUCING MULTIDIMENSIONAL REACTION-TYPE IMAGE

(71) Applicant: Momenti, Inc., New York, NY (US)

(72) Inventor: Chul Woo Lee, Seoul (KR)

(73) Assignee: Momenti, Inc., New York, NY (US)

(*) Notice: Subject to any disclaimer, the term of this patent is extended or adjusted under 35 U.S.C. 154(b) by 20 days.

This patent is subject to a terminal disclaimer.

(21) Appl. No.: 17/744,415

(22) Filed: May 13, 2022

(65) Prior Publication Data

US 2022/0269360 A1 Aug. 25, 2022

Related U.S. Application Data

(60) Continuation of application No. 16/890,419, filed on Jun. 2, 2020, now Pat. No. 11,360,588, which is a
(Continued)

(30) Foreign Application Priority Data

Sep. 7, 2016 (KR) .................. 10-2016-0115235
Sep. 7, 2017 (KR) .................. 10-2017-0114671

(51) Int. Cl.
*G06F 3/041* (2006.01)
*G06F 3/048* (2013.01)
(Continued)

(52) U.S. Cl.
CPC ............. *G06F 3/041* (2013.01); *G06F 3/048* (2013.01); *G06T 7/00* (2013.01); *H04N 5/93* (2013.01);
(Continued)

(58) Field of Classification Search
CPC ............ G06F 3/041; G06F 3/048; G06T 7/00; H04N 5/93; H04N 21/42204; H04N 5/76
(Continued)

(56) References Cited

U.S. PATENT DOCUMENTS 6,710,802 B2 3/2004 Akahori et al.
2002/0041327 A1 4/2002 Hildreth et al.
(Continued)

FOREIGN PATENT DOCUMENTS

CN 104063280 A 9/2014
JP 2005-216248 A 8/2005
(Continued)

OTHER PUBLICATIONS

International Search Report and Written Opinion for PCT/KR2016/008876 dated Nov. 9, 2016, 11 pages.
(Continued)

*Primary Examiner* — Jin Ge
(74) *Attorney, Agent, or Firm* — Studebaker & Brackett PC

(57) ABSTRACT

The present disclosure related to a method for playing a multidimensional reaction-type image. The method includes at least: receiving, by a computer, input manipulation to an object from a user; and extracting, by the computer, an image frame matched to a detailed cell corresponding to location information and depth information in a reaction-type image, depending on the location information and the depth information of the input manipulation received at each playback time point. The depth information is information about pressure strength of the input manipulation applied to the reaction-type image or time length to which the input manipulation is applied. The location information is information about a location of a two-dimensional space in which the input manipulation is applied to the reaction-type image.

19 Claims, 9 Drawing Sheets

Related U.S. Application Data division of application No. 16/331,475, filed as application No. PCT/KR2017/009837 on Sep. 7, 2017, now Pat. No. 11,003,264.

(51) Int. Cl.
  *G06T 7/00* (2017.01)
  *H04N 5/93* (2006.01)
  *H04N 21/422* (2011.01)
  *H04N 5/76* (2006.01)

(52) U.S. Cl.
  CPC ......... *H04N 21/42204* (2013.01); *H04N 5/76* (2013.01)

(58) Field of Classification Search
  USPC ....................................................... 345/471
  See application file for complete search history.

(56) References Cited

U.S. PATENT DOCUMENTS

| | | |
|---|---|---|
| 2002/0097247 A1 | 7/2002 | Ohba |
| 2002/0160823 A1 | 10/2002 | Watabe et al. |
| 2006/0120624 A1 | 6/2006 | Jojic et al. |
| 2006/0287023 A1 | 12/2006 | Yokoyama |
| 2014/0105463 A1 | 4/2014 | Wang et al. |
| 2014/0211002 A1 | 7/2014 | Lin et al. |
| 2014/0342344 A1* | 11/2014 | Lee ................. A63F 13/577 434/365 |
| 2015/0094127 A1 | 4/2015 | Canose et al. |
| 2016/0188181 A1* | 6/2016 | Smith ................ G06F 3/0412 715/765 |
| 2018/0182435 A1 | 6/2018 | Lee |

FOREIGN PATENT DOCUMENTS

| | | |
|---|---|---|
| JP | 2012-113387 A | 6/2012 |
| JP | 2013-058136 A | 3/2013 |
| JP | 2014-182717 A | 9/2014 |
| KR | 10-2008-0047845 A | 5/2008 |
| KR | 10-2013-0071978 A | 7/2013 |
| KR | 10-1582296 B1 | 1/2016 |
| KR | 10-2016-0019156 A | 2/2016 |
| WO | 2013/094820 A1 | 6/2013 |
| WO | 2017/026834 A1 | 2/2017 |
| WO | 2018/048227 A1 | 3/2018 |

OTHER PUBLICATIONS

International Preliminary Report on Patentability for PCT/KR2016/008876 dated Dec. 14, 2017, 18 pages.

International Search Report and Written Opinion for PCT/KR2017/009837 dated Dec. 11, 2017, 12 pages.

An Office Action; "Notice of Reasons for Refusal," mailed by the Japanese Patent Office on May 26, 2020, which corresponds to Japanese Patent Application No. 2019-513893 and is related to U.S. Appl. No. 17/744,415.

An Office Action; "Notice of Reasons for Refusal," mailed by the Japanese Patent Office on Jan. 12, 2021, which corresponds to Japanese Patent Application No. 2019-513893 and is related to U.S. Appl. No. 17/744,415.

An Office Action mailed by the Korean Intellectual Property Office on Dec. 3, 2020, which corresponds to Korean Patent Application No. 10-2019-0155377 and is related to U.S. Appl. No. 17/744,415.

* cited by examiner

[FIG. 1]
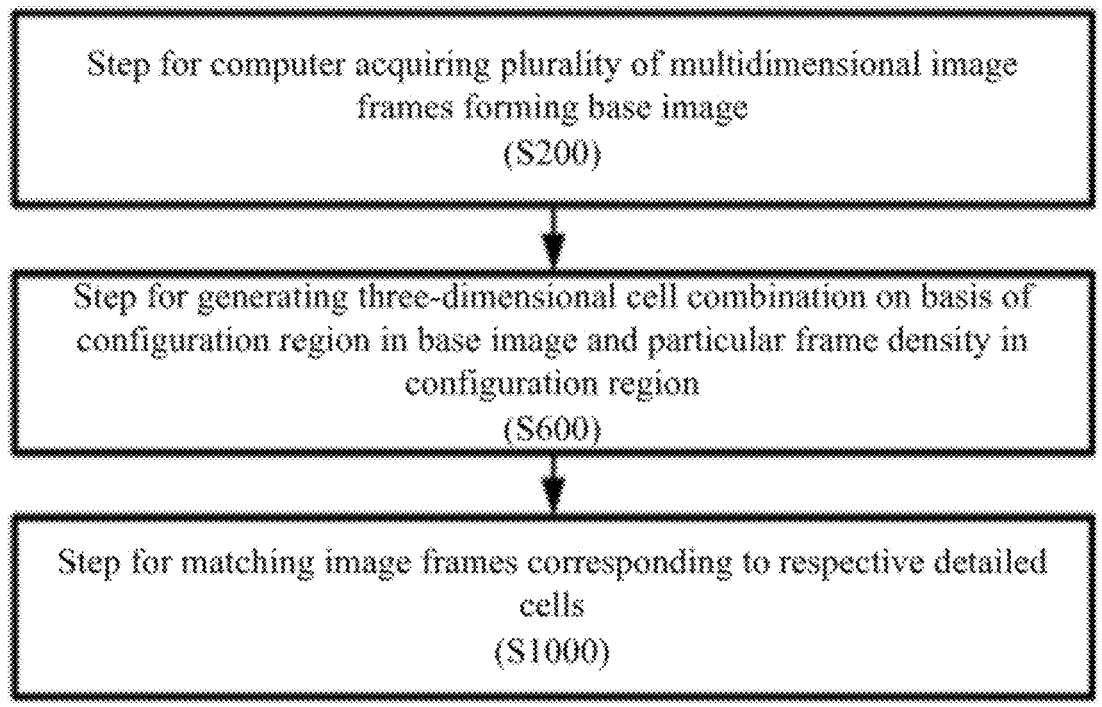

[FIG. 2]
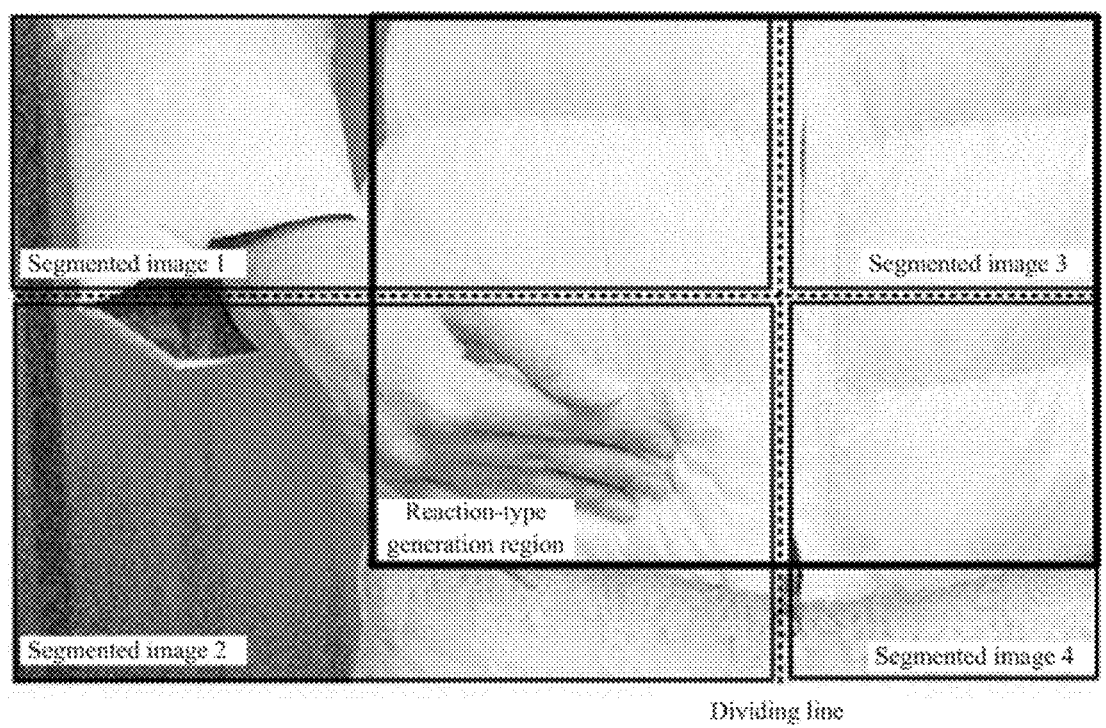

[FIG. 3]
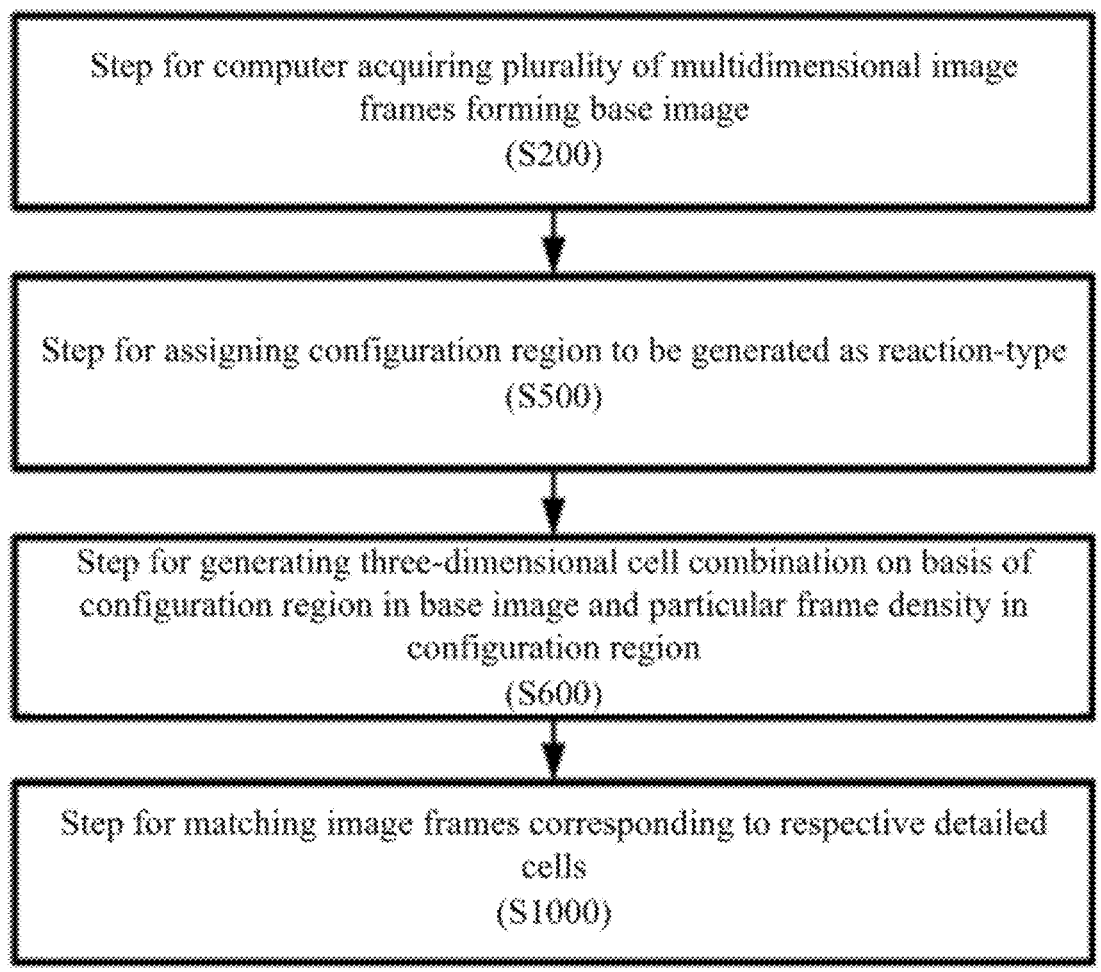

[FIG. 4]
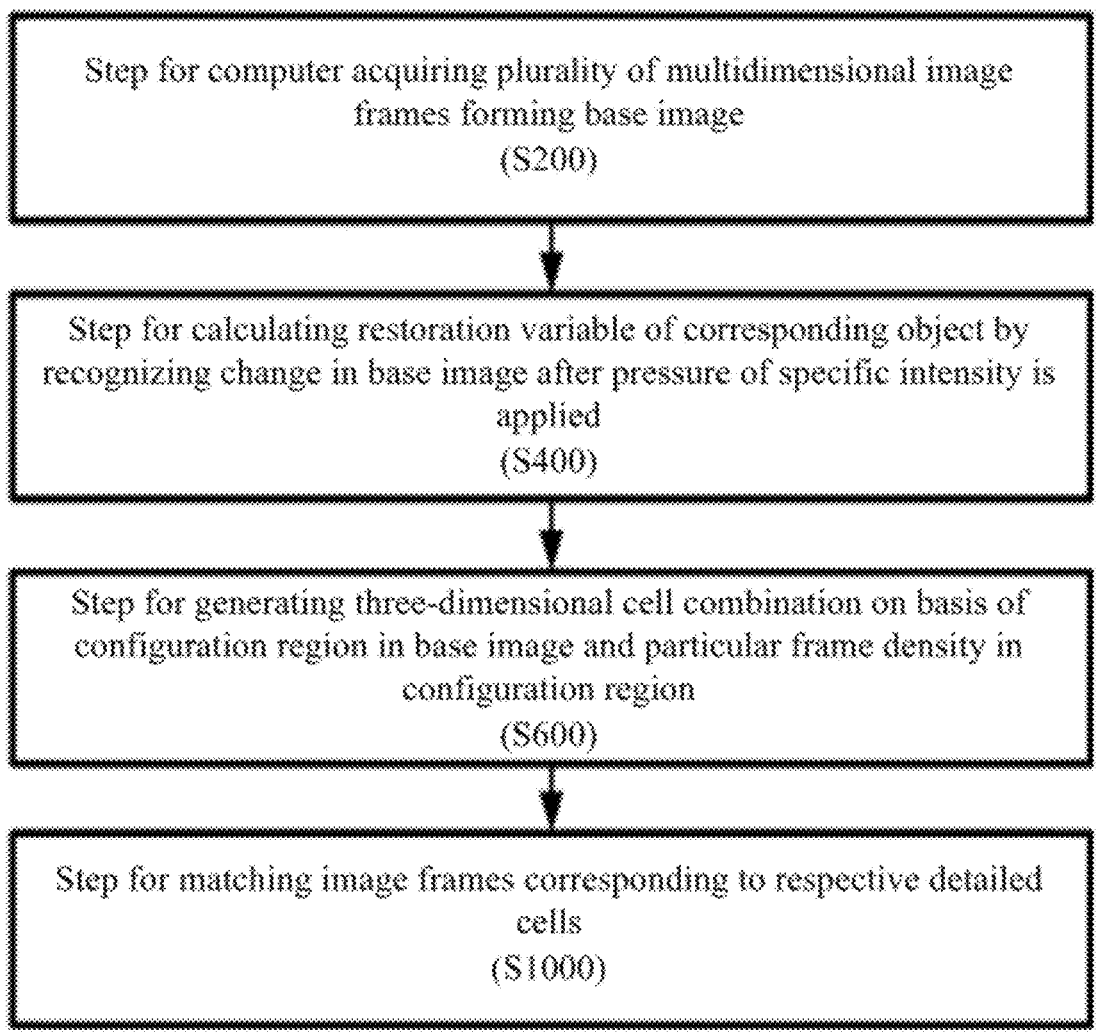

[FIG. 5]
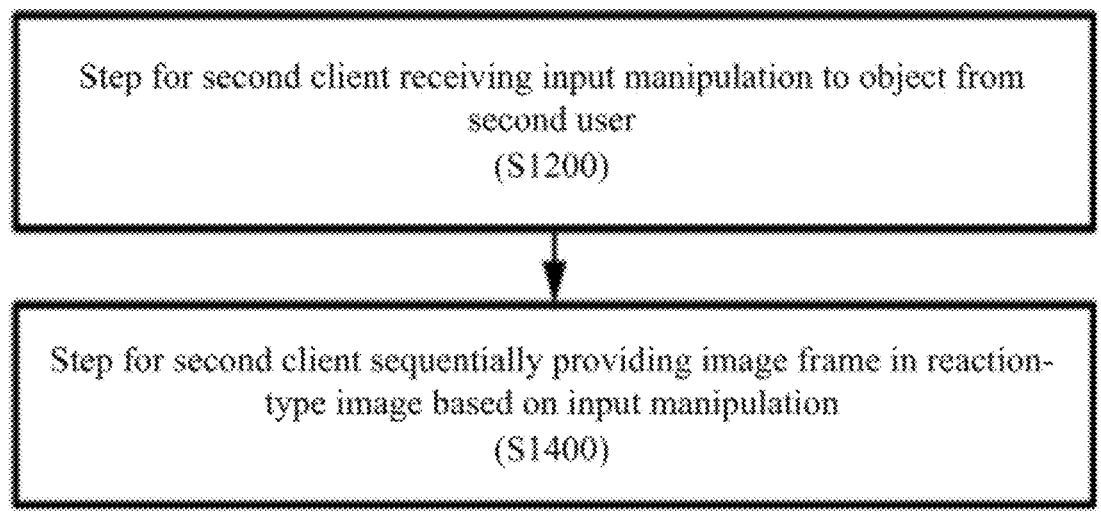

[FIG. 6]
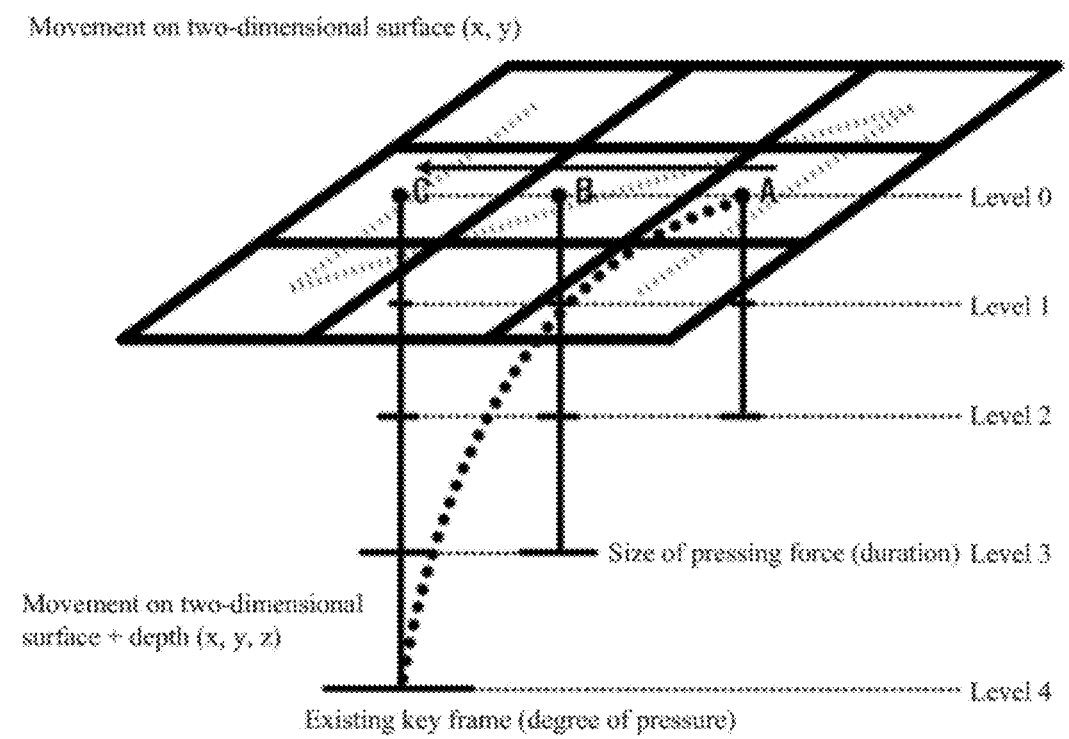

[FIG. 7]
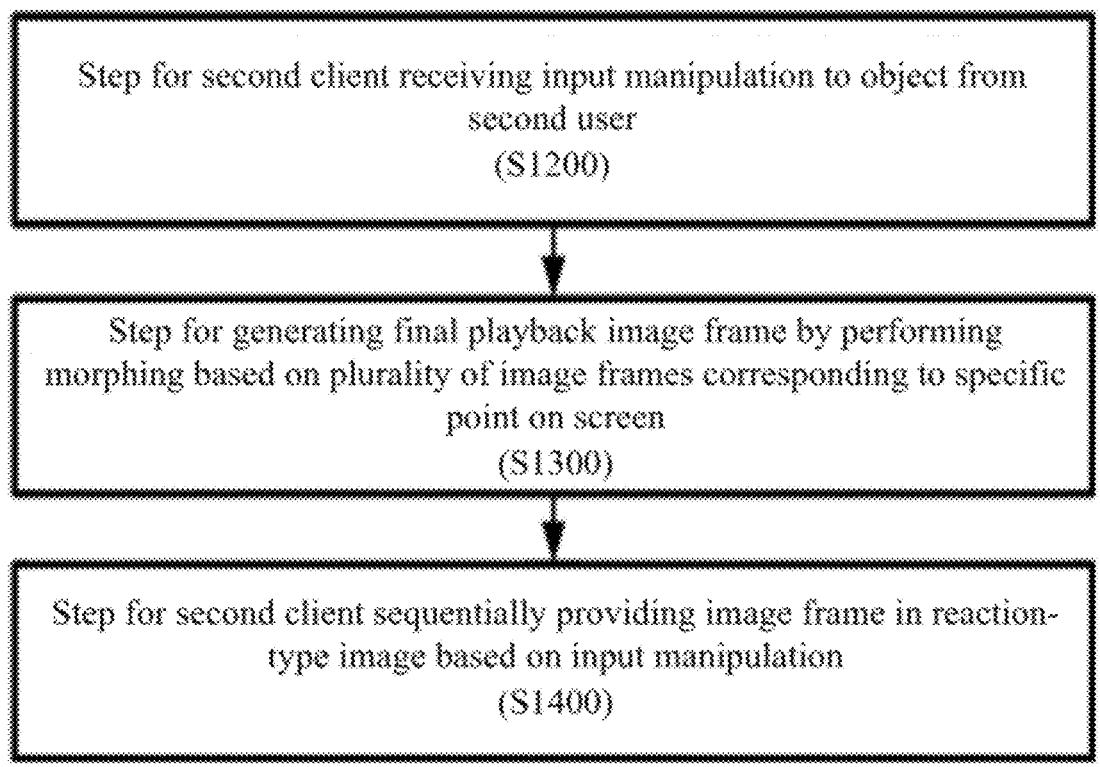

[FIG. 8]
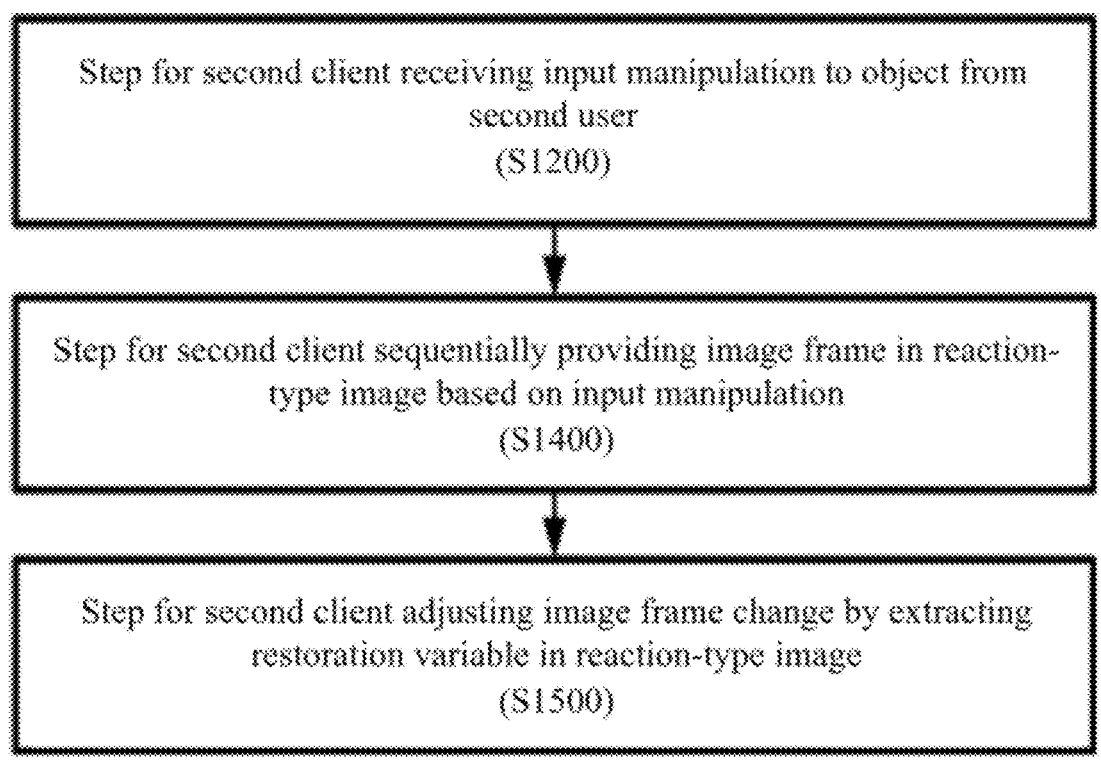

[FIG. 9]
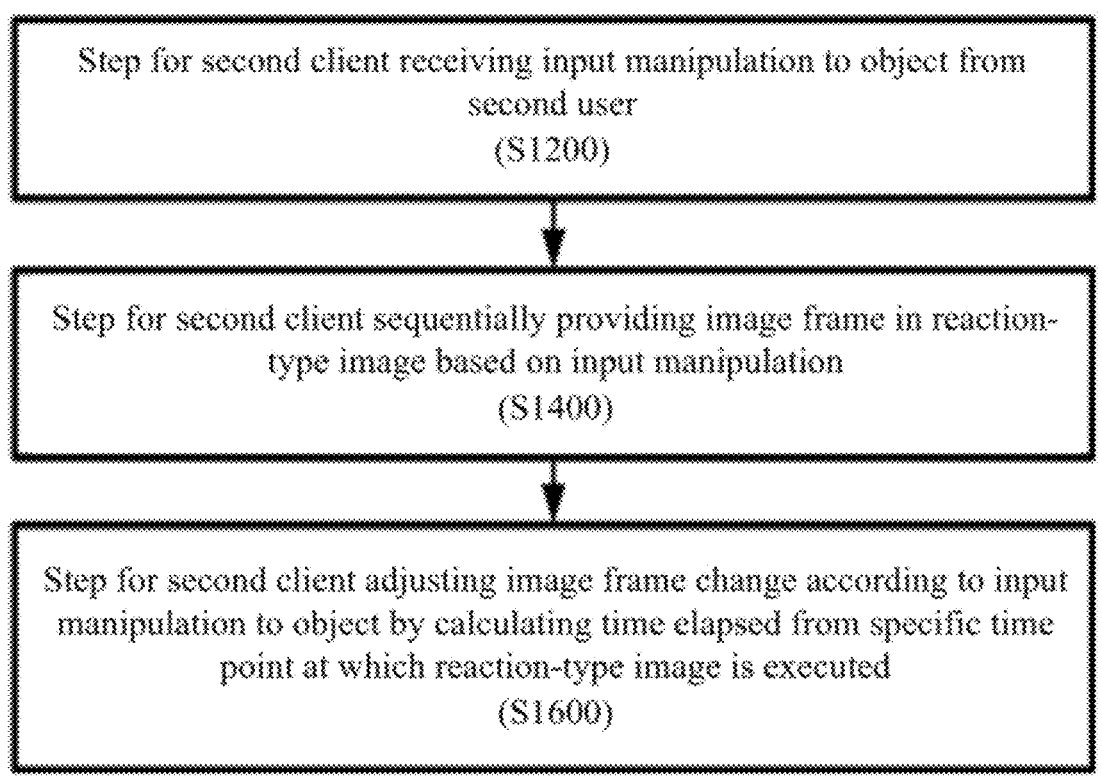

DEVICE, METHOD AND PROGRAM FOR GENERATING MULTIDIMENSIONAL REACTION-TYPE IMAGE, AND METHOD AND PROGRAM FOR REPRODUCING MULTIDIMENSIONAL REACTION-TYPE IMAGE

CROSS-REFERENCE TO RELATED APPLICATION

This application is a continuation application of U.S. patent application Ser. No. 16/890,419 filed on Jun. 2, 2020, which is a divisional application of U.S. patent application Ser. No. 16/331,475 filed on Mar. 7, 2019, which is the National Phase of International Application No. PCT/KR2017/009837, filed Sep. 7, 2017, which includes a claim of priority under 35 U.S.C. § 119(a) and § 365(b) to Korean Patent Application Nos. 10-2016-0115235, filed Sep. 7, 2016, and 10-2017-0114671, filed Sep. 7, 2017, in the Korean Intellectual Property Office. The above-listed applications are incorporated herein by reference in their entirety.

BACKGROUND

Embodiments of the inventive concept described herein relate to a device, a method and a program for generating a multidimensional reaction-type image, and a method and a program for reproducing a multidimensional reaction-type image.

Recently, a technology for capturing an image has been developed dramatically. Not only camcorders and digital cameras, but also mobile terminals such as smart phones may also capture high resolution images. Furthermore, a 360-degree camera, a 3D image camera and the like are emerging.

The image is captured by an image capturing device and stored in a specific format, and played by a playable terminal. Image playback is provided unilaterally in time order without interaction with viewers. In other words, the viewers may sense only the visual feeling through playing images.

SUMMARY

Embodiments of the inventive concept provide a device, a method and a program for generating a multidimensional reaction-type image, and a method and a program for reproducing a multidimensional reaction-type image that generate an image respond to input manipulation of a user as an image frame corresponding to manipulation to a specific region of an object is connected, and then provide the user.

According to an exemplary embodiment, a method for generating a multidimensional reaction-type image includes obtaining, by a computer, a plurality of multidimensional image frames forming a base image, wherein the base image is an image from applying manipulation to an object through a manipulation object, generating, by the computer, a three-dimensional cell combination based on a configuration region within the base image and a specific frame density within the configuration region, wherein the three-dimensional cell combination includes a plurality of detailed cells to which different depth information and different location information are assigned, and matching, by the computer, a respective image frame included in the base image to a corresponding detailed cell. The depth information is information about pressure strength of input manipulation applied to a reaction-type image or time length to which the input manipulation is applied. The location information is information about a location of a two-dimensional space in which the input manipulation is applied to the reaction-type image. The configuration region is a two-dimensional space area generated as the reaction-type image in an object, and the frame density is the number of steps of the depth information applied to a specific point in the base image.

In another embodiment, the multidimensional image frame is repeatedly obtained while a location and the pressure strength, at which manipulation is applied to a specific object through a manipulation object, are changed.

In another embodiment, the obtaining of the multidimensional image frames includes extracting a restoration image, which is restored after the input manipulation is applied in an entire image in which the input manipulation is applied to the object through the manipulation object and obtaining a plurality of image frames in the restoration image.

In another embodiment, the method further includes assigning the configuration region to be generated as the reaction-type image.

In another embodiment, the method further includes calculating a restoration variable of the object by recognizing a change within the base image after pressure of specific strength is applied.

According to an exemplary embodiment, a multidimensional reaction-type image generating program is coupled to hardware and is stored in media to perform the above-described multidimensional reaction-type image generating method.

According to an exemplary embodiment, a method for playing a multidimensional reaction-type image includes receiving, by a computer, input manipulation to an object from a user and extracting, by the computer, an image frame matched to a detailed cell corresponding to location information and depth information in a reaction-type image, depending on the location information and the depth information of the input manipulation received at each playback time point. The depth information is information about pressure strength of the input manipulation applied to the reaction-type image or time length to which the input manipulation is applied. The location information is information about a location of a two-dimensional space in which the input manipulation is applied to the reaction-type image. A specific image frame corresponding to the location information and the depth information of the input manipulation is matched to the detailed cell, and the detailed cell constitutes a three-dimensional cell combination in the reaction-type image.

In another embodiment, the method further includes generating, by the computer, a final playback image frame by performing morphing based on a plurality of image frame combinations, the depth information corresponding to a specific point on a screen of each of which is different, or a combination of an image frame provided at a previous time point and an image frame within the detailed cell corresponding to a current input manipulation, when successive input manipulations are entered into an adjacent region.

In another embodiment, the method further includes adjusting, by the computer, speed of image frame change by extracting a restoration variable from the reaction-type image.

In another embodiment, the method further includes adjusting, by the computer, an image frame change according to the input manipulation to the object by calculating time elapsing from a specific time point at which the reaction-type image is executed.

According to an exemplary embodiment, a reaction-type image generating program is coupled to hardware and is stored in media to perform the above-described multidimensional reaction-type image playing method.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 1 is a flowchart of a method for generating a multidimensional reaction-type image, according to an embodiment of the inventive concept;

FIG. 2 is an exemplary view for generating a plurality of segmented image to divide a reaction-type generation region into a plurality of playback regions, according to an embodiment of the inventive concept;

FIG. 3 is a flowchart of a method for generating a multidimensional reaction-type image, which further includes a procedure of assigning a reaction-type generation region, according to an embodiment of the inventive concept;

FIG. 4 is a flowchart of a method for generating a multidimensional reaction-type image, which further includes a procedure of calculating a restoration variable, according to an embodiment of the inventive concept;

FIG. 5 is a flowchart of a method for playing a multidimensional reaction-type image, according to an embodiment of the inventive concept;

FIG. 6 is an exemplary view illustrating a procedure of determining a detailed cell for extracting an image frame based on location information and depth information of input manipulation, according to an embodiment of the inventive concept;

FIG. 7 is a flowchart of a multidimensional reaction-type image playing method, which further includes an image frame morphing procedure, according to an embodiment of the inventive concept;

FIG. 8 is a flowchart of a method for playing a multidimensional reaction-type image, which further includes a procedure of adjusting image frame playback through a restoration variable, according to an embodiment of the inventive concept; and FIG. 9 is a flowchart of a method for playing a multidimensional reaction-type image, which further includes a procedure of adjusting an image frame change according to input manipulation by reflecting an object state change with time, according to an embodiment of the inventive concept.

DETAILED DESCRIPTION

Hereinafter, exemplary embodiments of the inventive concept will be described in detail with reference to the accompanying drawings. The above and other aspects, features and advantages of the inventive concept will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terms used herein are provided to describe the embodiments but not to limit the inventive concept. As used herein, the singular terms are intended to include the plural forms as well, unless the context clearly indicates otherwise. The terms "comprises" and/or "comprising" used herein does not exclude presence or addition of one or more other elements, in addition to the aforementioned elements.

In this specification, a 'computer' includes all the various devices capable of performing arithmetic processing. For example, the computer may correspond to not only a desktop personal computer (PC) or a notebook but also a smart phone, a tablet PC, a cellular phone, a personal communication service phone (PCS phone), a mobile terminal of a synchronous/asynchronous International Mobile Telecommunication2000 (IMT-2000), a palm PC, a personal digital assistant (PDA), and the like. Furthermore, a computer may correspond to a server computer that receives information from a client. Hereinafter, in this specification, a computer may be represented as a terminal or client.

In this specification, a 'reaction-type image' refers to an image played in a form corresponding to a specific input manipulation of a user (i.e., a viewer) who watches an image. For example, the reaction-type image refers to an image in which a motion of touching an object is played, such as an input manipulation to a touch screen, when input manipulation of touching a specific object (e.g., pillow) is applied to the touch screen by the user. Moreover, for example, the reaction-type image refers to an image in which motion of pressing an object and motion of restoring the object after the input manipulation of the user are played, when input manipulation of pressing a specific object is applied to the touch screen by the user.

In this specification, the 'base image' refers to a plurality of image frames combinations used to generate reaction-type images.

In this specification, the 'first client' refers to the client device of the first user (i.e., the reaction-type image creator) that generates the reaction-type image.

In this specification, the 'second client' refers to the client device of the second user (i.e., the reaction-type image user) that plays the reaction-type image.

In this specification, the 'input manipulation' refers to the manipulation to the image of the user received through the input means of the computer playing the reaction-type image. For example, the input manipulation may include manipulation (e.g., click manipulation, drag manipulation, contact touch manipulation, force touch manipulation (i.e., touch manipulation that applies a specific pressure to a touch screen or touch pad)) that can be entered into a specific point or region in the image, via the input means such as a mouse or touch screen. Moreover, for example, the input manipulation may include the arrangement state or motion of a terminal itself, which can be obtained using a sensor (e.g., an acceleration sensor, a gyro sensor, or the like) provided in a computer (or a terminal).

In this specification, the 'object' means an object in the reaction-type image, which is manipulated by the user. For example, in the case of an image from capturing an operation in which the user's hand touches a specific object, the object refers to an object touched by the user.

In this specification, the 'manipulation object' is for performing manipulation or motion on an object in an image. For example, when touching or pressing a bag or pillow in an image by using a hand, the manipulation object means the hand touching the bag or pillow.

Hereinafter, according to an embodiment of the inventive concept, a device, a method and a program for generating a multidimensional reaction-type image, and a method and a program for reproducing a multidimensional reaction-type image will be described with reference to drawings.

FIG. 1 is a flowchart of a method for generating a multidimensional reaction-type image, according to an embodiment of the inventive concept.

Referring to FIG. 1, according to an embodiment of the inventive concept, a method for generating a multidimensional reaction-type image includes acquiring, by a computer, a plurality of multidimensional image frames forming a base image (S200), generating a three-dimensional cell combination on the basis of a configuration region in the base image and a specific frame density in the configuration region (S600), and matching image frames corresponding to respective detailed cells (S1000). Hereinafter, the detailed description of each operation is provided.

In operation S200, the computer acquires a plurality of multidimensional image frames forming a base image. That is, the computer may obtain a multidimensional image frame via a camera, and may extract a plurality of image frames from an already acquired single image. For example, the computer may capture an image from manipulating a specific object through a specific manipulation object (e.g., a hand, a stick, an air pressure supply device, or the like).

In one embodiment of the method of generating the base image, while changing any one of various conditions, the computer obtains an image, in which specific manipulation (e.g., touching manipulation or pressing manipulation) is applied to a specific object through using a manipulation object, several times. That is, the computer may capture an image while changing only one condition of two-dimensional spatial motion (i.e., X-axis direction motion and Y-axis direction motion) and Z-axis direction motion (i.e., pressure to press an object) in a state where the locations of the object and the camera are fixed.

For example, in a state where the pressure and the location on the specific first axis (e.g., y-axis) are fixed, the computer obtains a base image moving in one direction along the second axis (e.g., the x-axis) and continuously obtains the base image while changing the pressure and the location on the specific first axis in turn. In particular, while fixing the pressure to press an object and fixing the value on the y-axis, the computer obtains an image that moves the manipulation object along the x-axis, via a camera; when movement to the x-axis direction is completed in a state where the pressure to the object and the location on the y-axis are fixed, the computer changes the location on the y-axis by the minimum unit, to obtain the base image repeatedly while moving again in the x-axis direction. Furthermore, after repeating the process of moving along the second axis while changing the location on the first axis, the computer can repeat the process of moving on the two-dimensional space by changing the pressure applied to the object by the manipulation object. As such, the computer may generate a final base image for generating a reaction-type image by obtaining an image frame corresponding to the pressure intensity at each location in a specific two-dimensional space.

In addition, in another embodiment of the method of generating the base image, upon generating and storing the base image, in a state where the computer fixes locations on the first axis (i.e., y-axis) and the second axis (e.g., pressure applied to the object), after the movement in the second axis (i.e., x-axis) direction is completed, the computer deletes an image in which the manipulation object returns to the initial point of the first axis to adjust the location on the first axis (i.e., the y-axis), without storing the image. That is, because an image frame in the process of moving in the opposite direction on the second axis to change the location of the first axis direction is an image frame unnecessary to generate a reaction-type image, the computer determines the motion direction of the manipulation object and deletes the image frame moving in the direction opposite to the direction in which the image frame is obtained, without storing the image frame. As such, a file size may be reduced by decreasing the number of image frames included in the reaction-type image.

Also, in another embodiment, the computer stores only the restoration image upon generating and storing the base image. The computer stores only the restoration image in which the state of the specific point of the object is restored to a state, where the external force is not applied, after the external force is applied. In particular, the computer deletes the playback range to which the pressure is applied by the manipulation object, and stores a playback range (i.e., restoration image) that is restored after the external force by the manipulation object is applied. The computer matches an image frame of the restored process to the detailed cell for each depth of the specific point. As such, the computer may obtain an image frame whose surface state of the specific point changes without being masked by the manipulation object.

Furthermore, in another embodiment, the computer may perform image processing (e.g., a method of cutting and pasting a part of an object image corresponding to a manipulation object) using a frame in which only the object is present in the region masked because the manipulation object is located, and then may generate and store an image frame including only the object without the manipulation object.

Moreover, in another embodiment, the computer stores the image frame for each manipulation type so as to provide different image frames depending on the manipulation type of the user. For example, when a user applies pressure to a specific point in a reaction-type image and then performs manipulation to remove the pressure, the object region other than the point at which the pressure is applied needs not to be changed. On the other hand, when a manipulation object moves in a specific direction while applying pressure, an image frame in which the region where the manipulation object has passed after the pressure has already been applied by the manipulation object is restored needs to be provided. Accordingly, the computer stores different image frames depending on each manipulation type (e.g., manipulation to touch a specific point, manipulation to drag a manipulation object while applying specific pressure to a touch screen) such that different image frames are provided. To this end, the computer determines the manipulation type entered onto the touch screen and determines the type of an image frame to be provided in turn.

Afterward, in operation S600, the computer generates a three-dimensional cell combination within the reaction-type generation region, based on the configuration region within the base image and the specific region density within the configuration region. The configuration region is a two-dimensional space area to which manipulation is applied by the manipulation object within an object. The frame density means the number of frames matched at a specific point.

That is, the frame density corresponds to the number of depths (Z-axis direction depth) given to the configuration region or the number of steps of applied pressure strength. In the case of an object whose shape is deformed by an external force, because the depth of the Z-axis direction changes depending on the pressure strength, the frame density may correspond to either the depth step or the pressure strength step.

The frame density may be set by the first user or may be set by the computer (i.e., the first client). For example, the computer may set the frame density based on the number of pressure strength steps sensed by the force touch sensor. For example, the number of pressure strength steps sensed by the force touch sensor is applied at the maximum frame density; when the number of image frames actually obtained is less than the frame density, the computer may allow the same image frame to be matched to a plurality of successive detailed cells.

The computer forms a three-dimensional cell combination based on the number of divided detailed unit and the frame density of the configuration region. The cell combination is divided into pieces by a unit interval in the x-axis direction; the cell combination is divided into 'M' pieces by a unit interval in the y-axis direction; the cell combination is divided into 'N' pieces in the Z axis direction so as to correspond to the frame density and includes detailed cells of (L*M*N). The corresponding point and pressure strength in the configuration region are assigned to a respective detailed cell, and the respective detailed cell is matched with a location suitable for the configuration region. That is, the computer generates an array of cell combinations and allows image frame storage locations corresponding to individual cells in the array to be connected.

Afterward, in operation S1000, the computer matches and stores the image frame corresponding to the respective detailed cell. That is, the computer stores the image frame individually in each detailed cell, based on the location in the two-dimensional space of each image frame in the base image, the pressure applied to the object, or Z-axis direction depth.

Various methods of matching a frame according to pressure strength to each detailed cell may be applied. In an embodiment, when the maximum intensity is set in the computer and the total intensity is set by dividing the total intensity into the specific number of units, the computer sets the pressure strength as the number of pressures is received from the user. Moreover, in another embodiment, the computer may allow the input manipulation to be applied during the playback of the base image, and may determine the location information and depth information corresponding to each image frame to match the detailed cell.

Moreover, in an embodiment of a method for determining a location in a two-dimensional space, the computer recognizes the location of two-dimensional space where input manipulation is applied, through image recognition and determines that the corresponding location on the screen is the point at which the detailed cell on the screen is to be matched.

Moreover, in another embodiment, as illustrated in FIG. 2, the computer generates a segmented image from dividing each image frame and matches the segmented image to each corresponding point on the touch screen, so as to divide the reaction-type generation region into the specific number of playback regions. At the time of image acquisition, the computer divides the obtained image frame into a plurality of segmented images by a dividing line for dividing the reaction-type generation region and individually matches the segmented image to each point on the touch screen. Afterward, as one or more manipulations are entered on the entire touch screen, the computer extracts and combines segmented images corresponding to the manipulation of each playback area to provide the combined image on the touch screen. As such, a plurality of regions, which are divided based on one image frame source, may be implemented to be played in multiple manners; when the input manipulation is entered into a plurality of points by the user, the computer may generate a reaction-type image in which the reaction is generated at a plurality of points.

Moreover, in another embodiment, as illustrated in FIG. 3, in operation S500, the method further includes assigning a configuration region to be generated as a reaction-type. In an embodiment, the computer may assign a range including a region, where the appearance is changed in the object in the base image, as a configuration region. For example, when a first user applies an external force to an object (e.g., padding jumper) using a manipulation object (e.g., hand), the computer may determine that only the portion (i.e., the part where the padding jumper is pressed) whose appearance changes by an external force is a region to be converted into reaction-type by first user. Moreover, when a manipulation object is captured as well as an object in the base image, the computer may assign the configuration region by excluding the motion of the manipulation object and recognizing only the appearance change of the object.

Moreover, in another embodiment of assigning the configuration region, the computer extracts the object image itself that is identically present in a plurality of image frames in the base image to assigns the extracted object image to the configuration region. That is, because the object surface includes the region to be generated as a reaction-type, the computer may assign the entire range of objects included identically in the base image to the configuration region.

Moreover, in another embodiment of assigning the configuration region, the computer tracks the motion of the manipulation object (e.g., hand) to assign a range including the movement path of the manipulation object (e.g., hand) to the configuration region. That is, the computer extracts the region where the manipulation object moves and then assigns the extracted region to the configuration region.

Moreover, in another embodiment of assigning the configuration region, the computer receives an input to set the reaction-type region to the specific image frame, from the first user. For example, the computer may extract and provide a specific image frame in the base image on the screen and may allow a user to assign a two-dimensional range of objects to a configuration region.

When the locations of the camera and object are fixed in the base image, the computer may provide an arbitrary image frame and then may set the region of the object through touch manipulation. The computer may identically assign the configuration region assigned to a specific frame, to all the frames. Moreover, for another example, when the location of a camera or an object is changed, the computer may assign the configuration region within the specific image frame, and then automatically assign the region within each image frame corresponding to the image of the configuration region, to the configuration region.

Moreover, in another embodiment, as illustrated in FIG. 4, the method further includes calculating (S400) a restoration variable of the corresponding object by recognizing a change in the base image after the pressure of a specific intensity is applied. The restoration variable means a variable that allows the reaction-type image to be actually restored after the pressure manipulation with the user's specific pressure strength on the touch screen, with respect to a motion in which the actual object is restored to a state where pressure is not applied. The computer (i.e., the first client) may calculate the restoration variable to include the restoration variable in the reaction-type image and then may provide the reaction-type image to the second client; as described below, the second client may reflect the restoration variable upon playing the image frame of the reaction-type image. That is, as the second client plays the reaction-type image by reflecting the restoration variable, the second client may represent a reaction-type image to be similar to the shape from restoring an actual object's appearance. As the pressure is applied on the touch screen by applying the restoration variable, the image frame is sequentially changed depending on the pressure change, the second client plays the image frame such that the appearance is restored to be the same to the motion of the actual object.

In an embodiment of calculating the restoration variable, the computer obtains a plurality of image frames restored after applying pressure to the object by the manipulation object upon generating the base image, and calculates the restoration variable based on the change of the object in the image frame per hour.

Moreover, in another embodiment of generating a restoration variable, in a process of obtaining a plurality of image frames included in the base image while a specific pressure is applied by the manipulation object in the reaction-type generation region, the computer calculates the restoration variable by analyzing the object change in the region (e.g., a region in which a hand has passed when moving with pressure applied to the object by hand) where the manipulation object moves on the object. As such, the user does not need to perform the process of applying the pressure to the object using the manipulation object for the purpose of calculating the restoration variable, thereby easily generating a realistic reaction-type image.

Moreover, in another embodiment, the computer recognizes the type of the captured object or the motion of a manipulation object, through image learning and determines the restoration variable corresponding to the characteristic of the object. As an example in which the computer learns an image, the computer may learn the type of an object or the motion of a manipulation object, using a machine learning algorithm. The machine learning algorithm includes a deep learning algorithm that performs learning based on a neural network.

For example, the computer may recognize the object included in the base image based on the image, which is established using big data or which is obtained through crawling. Moreover, for example, the computer accumulates an image of manipulation object motion (e.g., hand motion) included in a plurality of videos to perform learning and determines what action or manipulation the motion performed by the manipulation object is, based on a plurality of frames corresponding to the manipulation object motion in the base image.

FIG. 5 is a flowchart of a method for playing a multidimensional reaction-type image, according to an embodiment of the inventive concept.

Referring to FIG. 5, a multidimensional reaction-type image playing method includes receiving (S1200), by a second client, input manipulation to an object from a second user and sequentially providing (S1400), by the second client, image frame in the reaction-type image based on the input manipulation. Hereinafter, the detailed description of each operation is provided.

In operation S1200, the second client receives input manipulation to the object, from the second user. That is, the second client obtains a detailed cell condition corresponding to the input manipulation by the second user. The second client obtains location information (i.e., the X coordinate and Y coordinate at the point at which user input manipulation is applied) and depth information (i.e., the applied pressure data or the time length in which a manipulation object contacts a screen) on the screen through input manipulation of the second user.

When successive input manipulations are applied by the second user, the second client obtains location information and depth information at a unit time interval. For example, when moving in a specific axis direction (e.g., X-axis direction or Y-axis direction), the second client obtains the changed location information and the changed depth information at a unit time interval. Moreover, for example, when input manipulation is received from the second user while the pressure strength is changed in a diagonal direction, the second client sequentially obtains the changed location information and the changed depth information.

In operation S1400, the second client sequentially extracts and provides an image frame in the reaction-type image based on the input manipulation. As the location information and depth information of the input manipulation is changed, the computer extracts the image frame matched to the detailed cell corresponding to the changed location information and the changed depth information to continuously provide the extracted image frame.

As illustrated in FIG. 6, when input manipulation to point A, point B, point C moves while the pressure strength or contact time length of the input manipulation increases, the second client searches for a detailed cell corresponding to the applied pressure strength or the contact time length in a plurality of detailed cells of the location (e.g., the location where the finger is contacted) where the input manipulation is applied and extracts the image frame matched to the detailed cell.

In particular, at point A, as pressure is not applied and a manipulation object is contacted, the second client selects the detailed cell of level '0'; at point B, the second client selects the detailed cell of level '0' based on the pressure strength; and at point C, the second client selects the detailed cell of level '4' based on the pressure strength. The second client sequentially provides image frames matched to each detailed cell selected while moving from point A to point C.

In an embodiment, the second client, which is a computer, may receive and play each image frame from the service server. For example, the second client transmits, to the service server, the location (e.g., a pixel location on the screen to which input manipulation of the second user is applied) on the screen and the pressure strength measured by the pressure sensor or the time length contacted on the screen; the service server searches for a specific detailed cell in the cell combination based on the transmitted result and provides the second client with the image frame matched to the found result. The second client extracts the image frame received from the service server on the screen. When the delay according to communication between a service server and a client is short, an image frame corresponding to location information and depth information (i.e., pressure strength or contact time length) of the input manipulation may be displayed after a short time after the input manipulation of the second user is entered into the second client, and thus an image may be implemented as if a user is responding directly to second user manipulation.

Moreover, in another embodiment, after the second client receives the entire cell combination of the reaction-type image from the service server or the first client, the second client searches for specific detailed cells in the cell combination, based on location information and depth information (i.e., the applied pressure strength or the time length) according to the input manipulation at each point in time, and extracts the image frame matched to the found result to display the extracted image frame on the screen.

As such, without the need to separately include the image to be played for each input manipulation motion by a user, the second client may implement various object motions corresponding to the input manipulation of the second user, by store image frames according to each input manipulation condition (i.e., location information and depth information) in a database.

Moreover, in another embodiment, the second client may differently determine a detailed cell that extracts a frame to be played sequentially depending on the method for applying the input manipulation. 10075I Moreover, in another embodiment of the inventive concept, the method further includes generating (S1300), by a second client, a final playback image frame by performing morphing based on a plurality of image frames corresponding to a specific point on a touch screen (i.e., screen) when successive manipulations are entered into adjacent regions. For example, when the computer stores the obtained image frame, which is obtained while the computer manipulates the object in the first axis direction and the second axis direction as specific pressure is applied by the user, as a base image, the computer generates an image frame on which morphing is performed, with respect to regions other than the point where touch manipulation is entered at a specific point in time, based on a plurality of image frames. As such, a reaction-type image changed naturally during the user's manipulation may be generated.

In particular, as the image frame provided at the first time point, the location of a finger, and pressure strength are changed, the second client performs morphing based on the image frame provided at the second time point (a point in time when the specific time elapses from the first time point). That is, the second client performs morphing using the image frame of a detailed cell corresponding to the current input manipulation and one or more previously provided image frames. For example, the second client may generate a final playback image frame by applying the average value of the image frame at the first time point and the image frame at the second time point to the same point.

As such, although the image frame in the detailed cell matched to the input manipulation is not matched to the motion performed by the second user, the final playback image frame matched to the motion through correction may be generated. That is, the sense of reality may be provided by providing an image suitable for the motion provided by the second user, various image frames may be generated in a state where only the basic image frame is matched to each detailed cell and stored without the need to store image frames for all the motions, thereby saving storage space.

Moreover, the second client may transform the image region within the predetermined range from a point at which the input manipulation is entered by the second user. That is, because deformation occurs in the surrounding region as pressure is applied to a specific point, the second client performs correction on the surrounding region together.

The second client may perform correction such that the set input manipulation is represented as being continuously changed from the applied point to the end of the set peripheral region. For example, the correction is performed such that the color is changed sequentially based on the color value at a point at which the input manipulation is applied and the color value of the end of the surrounding region. At this time, the second client may utilize the image frame of a default state to which the input manipulation is not applied.

The second client may differently determine the peripheral region range to be corrected, depending on the pressure strength of the input manipulation. For example, when the object to which the input manipulation is applied is a cushion, because the region where the surface deformation occurs becomes wider as the strong pressure is applied, the second client determines the deformation range depending on the pressure intensity to provide the sense of reality upon playing the reaction-type image.

Moreover, in another embodiment, the method further includes adjusting (S1500), by the second client, an image frame change by extracting a restoration variable in a reaction-type image. That is, the second client adjusts the speed at which the image frame is changed after the input manipulation is applied, based on the restoration variable provided while the reaction-type image is included together. As such, an image may be played as if an actual object is manipulated.

Moreover, in another embodiment, the method further includes adjusting (S1600), by the second client, the image frame change according to input manipulation to an object by calculating the time elapsed from the specific time point at which the reaction-type image is executed. As such, when a state change occurs over time in real, the characteristic of the object (e.g., fruit, bread, cement, or the like) with different degrees of deformation according to pressure may be implemented with a real-world state change even in the reaction-type image; users may feel the change of hardness of object as time goes on, through the reaction-type image. For example, the second client may change the image frame with less object deformation to the last frame provided depending on pressure or may adjust the speed of an image frame change, and thus it is realized that bread is hardened and puffiness of the bread is reduced over time in a reaction-type image and it is realized that cement, clay, or the like is hardened over time in a reaction-type image.

The multidimensional reaction-type image generating device according to another embodiment of the inventive concept includes a controller. The controller performs a multidimensional reaction-type image generating method according to embodiments of the inventive concept.

Moreover, another embodiment of a multidimensional reaction-type image generating device includes an image capturing unit (i.e., camera) for capturing a base image.

According to an embodiment of the inventive concept described above, a method for generating or playing a multidimensional reaction-type image may be implemented as a program (or application) to be executed in combination with a hardware computer and may be stored in a medium.

The above-described program may include a code encoded by using a computer language such as C, C++, JAVA, a machine language, or the like, which a processor (CPU) of the computer can read through the device interface of the computer, such that the computer reads the program and performs the methods implemented with the program. The code may include a functional codes associated with the function that defines functions necessary to perform the methods, and may include a control code associated with an execution procedure necessary for the processor of the computer to perform the functions in a predetermined procedure. Furthermore, the code may further include additional information necessary for the processor of the computer to perform the functions or a memory reference-related code associated with the location (address) of the internal or external memory of the computer, at which the media needs to be checked. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The stored media may mean the media that does not store data for a short period of time such as a register, a cache, a memory, or the like but semi-permanently stores to be read by the device. Specifically, for example, the stored media include, but are not limited to, ROM, RAM, CD-ROM, magnetic tape, floppy disk, optical data storage device, and the like. That is, the program may be stored in various recording media on various servers that the computer can access, or various recording media on the computer of the user. In addition, the media may be distributed to a computer system connected to a network, and a computer-readable code may be stored in a distribution manner.

Although embodiments of the inventive concept have been described herein with reference to accompanying drawings, it should be understood by those skilled in the art that the inventive concept may be embodied in other specific forms without departing from the spirit or essential features thereof. Therefore, it should be understood that the above embodiments are not limiting, but illustrative.

The inventive concept has the following various effects.

First, the reaction-type image may be played as if the surface of an object is changed in real when a user performs the touch manipulation, thereby providing a realistic playback image to the user.

Second, the viewer's interest in the image may increase and the delivery may be maximized. As such, the publicity effect on a specific object in the image may be improved.

Third, when generating an image in which a specific operation is repeated or an image including an operation that reciprocates a specific section, such as stroking an object, only the image moving in a specific first direction may be obtained, and then the image may be repeatedly played (e.g., repeat forward direction and reverse direction playback) depending on a user's input manipulation. As such, the storage capacity of the image including the repeated operation may be reduced.

Fourth, a realistic final playback image frame corresponding to the manipulation provided on the screen by the user may be provided by performing morphing based on a basic image frame stored in each detailed cell. Accordingly, because it is not necessary to store different image frames for each motion type, the storage capacity may be reduced significantly.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for generating a multidimensional reaction-type image of a computing device, the method comprising:
   obtaining, by the computing device, a plurality of multi-dimensional image frames forming a base image, wherein the base image is an image from applying manipulation to an object through a manipulation object;
   generating, by the computing device, a three-dimensional cell combination based on a configuration region within the base image and a specific frame density within the configuration region, wherein the three-dimensional cell combination includes a plurality of detailed cells to which different depth information and different location information are assigned; and
   generating, by the computing device, a reaction-type image having a multi-dimensional by matching each image frame included in the base image to the corresponding detailed cell;
   wherein the depth information includes information about at least one of a pressure strength and a time length of input manipulation applied to the reaction-type image,
   wherein the location information includes information about a location of a two-dimensional space in which the input manipulation is applied to the reaction-type image,
   wherein the configuration region includes a two-dimensional space area generated as the reaction-type image in the object,
   wherein the frame density includes a number of a plurality of multi-dimensional image frames matched to a specific point in the base image, and
   wherein the plurality of multi-dimensional image frames are repeatedly obtained while changing the location and the pressure strength at which a manipulation is applied to the object to a specific pattern.

2. The method of claim 1, further comprising:
   calculating a restoration variable of the object by recognizing a change in the base image after the pressure of a specific intensity is applied to the object.

3. The method of claim 1, wherein the obtaining of the multi-dimensional image frames includes:
   extracting a restoration image, which is restored after the input manipulation is applied in an entire image in which the input manipulation is applied to the object through the manipulation object; and
   obtaining the plurality of image frames in the restoration image.

4. The method of claim 1, further comprising:
   assigning the configuration region to be generated as the reaction-type image.

5. The method of claim 4, wherein the assigned configuration region includes at least one of a first region in which a shape change of the object occurs in the base image, a second region including the object that exists in common in the plurality of multi-dimensional image frames in the base image, and a third region including a movement path of the manipulation object.

6. The method of claim 1, further comprising:
   receiving input manipulation to the object from a user; and
   extracting an image frame matched to a detailed cell corresponding to location information and depth information in the reaction-type image, based on the location information and the depth information of the input manipulation received at each playback time point,
   wherein the detailed cell is matched to a specific image frame corresponding to the location information and the depth information of the input manipulation, and constitutes a three-dimensional cell combination in the reaction-type image.

7. The method of claim 6, further comprising:
adjusting a speed of change of an image frame by extracting a restoration variable from the reaction-type image.

8. The method of claim 6, further comprising:
adjusting a change of the image frame according to the input manipulation to the object by calculating time elapsing from a specific time point at which the reaction-type image is executed.

9. The method of claim 6, further comprising:
when successive input manipulations are entered into an adjacent region, generating a final playback image frame by performing morphing based on a combination of a plurality of image frames having different depth information corresponding to a specific point on the screen, or a combination of an image frame provided at a previous time point and an image frame in a detailed cell corresponding to a current input manipulation.

10. A non-transitory computer readable recording medium storing a program that, when executed by a processor of a computing device, causes the processor to execute the method of claim 1.

11. A computing device for providing a multidimensional reaction-type image, the computing device comprising:
a memory configured to store a plurality of processes for generating and playing the multidimensional reaction-type image; and
a processor configured to control an operation of the computing device based on the plurality of processes stored in the memory, and
wherein the processor is further configured to:
obtain a plurality of multi-dimensional image frames forming a base image, wherein the base image is an image from applying manipulation to an object through a manipulation object,
generate a three-dimensional cell combination based on a configuration region within the base image and a specific frame density within the configuration region, wherein the three-dimensional cell combination includes a plurality of detailed cells to which different depth information and different location information are assigned, and
generate a reaction-type image having a multi-dimensional by matching each image frame included in the base image to the corresponding detailed cell,
wherein the depth information includes information about at least one of a pressure strength and a time length of input manipulation applied to the reaction-type image,
wherein the location information includes information about a location of a two-dimensional space in which the input manipulation is applied to the reaction-type image,
wherein the configuration region includes a two-dimensional space area generated as the reaction-type image in the object,
wherein the frame density includes a number of a plurality of multi-dimensional image frames matched to a specific point in the base image, and
wherein the plurality of multi-dimensional image frames are repeatedly obtained while changing the location and the pressure strength at which a manipulation is applied to the object to a specific pattern.

12. The computing device of claim 11, wherein the processor is further configured to calculate a restoration variable of the object by recognizing a change in the base image after the pressure of a specific intensity is applied to the object.

13. The computing device of claim 11, wherein the processor is further configured to:
extract a restoration image, which is restored after the input manipulation is applied in an entire image in which the input manipulation is applied to the object through the manipulation object, and
obtain the plurality of image frames in the restoration image.

14. The computing device of claim 11, wherein the processor is further configured to assign the configuration region to be generated as the reaction-type image.

15. The computing device of claim 14, wherein the assigned configuration region includes at least one of a first region in which a shape change of the object occurs in the base image, a second region including the object that exists in common in the plurality of multi-dimensional image frames in the base image, and a third region including a movement path of the manipulation object.

16. The computing device of claim 11, wherein the processor is further configured to:
receive input manipulation to the object from a user, and
extract an image frame matched to a detailed cell corresponding to location information and depth information in the reaction-type image, based on the location information and the depth information of the input manipulation received at each playback time point,
wherein the detailed cell is matched to a specific image frame corresponding to the location information and the depth information of the input manipulation, and constitutes a three-dimensional cell combination in the reaction-type image.

17. The computing device of claim 16, wherein the processor is further configured to adjust a speed of change of an image frame by extracting a restoration variable from the reaction-type image.

18. The computing device of claim 16, wherein the processor is further configured to adjust a change of the image frame according to the input manipulation to the object by calculating time elapsing from a specific time point at which the reaction-type image is executed.

19. The computing device of claim 16, wherein the processor is further configured to:
when successive input manipulations are entered into an adjacent region, generate a final playback image frame by performing morphing based on a combination of a plurality of image frames having different depth information corresponding to a specific point on the screen, or a combination of an image frame provided at a previous time point and an image frame in a detailed cell corresponding to a current input manipulation.

* * * * *